United States Patent [19]

Choy

[11] Patent Number: 6,092,061
[45] Date of Patent: Jul. 18, 2000

[54] DATA PARTITIONING BY CO-LOCATING REFERENCED AND REFERENCING RECORDS

[75] Inventor: David Mun-Hien Choy, Los Altos, Calif.

[73] Assignee: International Business Machines Corporation, Armonk, N.Y.

[21] Appl. No.: 08/911,717

[22] Filed: Aug. 15, 1997

[51] Int. Cl.[7] .................................................. G06F 17/30
[52] U.S. Cl. ........................................ 707/1; 707/2; 707/3
[58] Field of Search .................................. 707/3, 10, 100, 707/102, 2, 101; 395/200.31, 200.38, 200.47, 200.45

[56] References Cited

U.S. PATENT DOCUMENTS

| | | | |
|---|---|---|---|
| 4,853,843 | 8/1989 | Ecklund | 364/200 |
| 5,058,002 | 10/1991 | Nakamura et al. | 707/1 |
| 5,089,954 | 2/1992 | Rago | 395/600 |
| 5,121,494 | 6/1992 | Dias et al. | 395/600 |
| 5,448,727 | 9/1995 | Annevelink | 707/101 |
| 5,499,367 | 3/1996 | Bamford et al. | 395/600 |
| 5,515,531 | 5/1996 | Fujiwara et al. | 707/8 |
| 5,551,027 | 8/1996 | Choy et al. | 707/201 |
| 5,555,404 | 9/1996 | Torjornsen et al. | 395/200.31 |
| 5,625,815 | 4/1997 | Maier et al. | 707/8 |
| 5,727,197 | 3/1998 | Burgess et al. | 707/2 |
| 5,842,207 | 11/1998 | Fujiwara et al. | 707/7 |
| 5,850,522 | 12/1998 | Wlaschin | 395/200.45 |
| 5,991,758 | 11/1999 | Ellard | 707/6 |

*Primary Examiner*—Jean R. Homere
*Attorney, Agent, or Firm*—Gray Cary Ware Freidenrich

[57] ABSTRACT

A partitioning scheme for co-locating records of a table with records they reference. In a distributed database system, records of one table or relation may be stored at different locations. In order to optimize database query processing the present invention partitions records of a table by reference. A record in a table may reference another record in the table or in another table. The present invention stores (or co-locates) the referencing record with the referenced record.

26 Claims, 4 Drawing Sheets

| CITY | |
|---|---|
| City Code | City Name |
| 01 | New York |
| 02 | Chicago |
| 03 | Los Angeles |

FIGURE 1

| EMPLOYEE | | | |
|---|---|---|---|
| Employee No. | Name | Salary | City Code |
| 01 | John Doe | 50,000 | 02 |
| 02 | Sally Jones | 75,000 | 01 |
| 03 | Frank Wright | 65,000 | 02 |
| 04 | Lloyd Taylor | 120,000 | 03 |
| 05 | Fran Crown | 34,000 | 01 |
| 06 | Willie Smith | 48,000 | 01 |

FIGURE 2

| JOB | | | |
|---|---|---|---|
| Job No. | Job Name | Job Cost | Employee No. |
| 01 | Blue | 200,000 | 06 |
| 02 | Green | 450,000 | 03 |
| 03 | Yellow | 780,000 | 04 |
| 04 | Orange | 560,000 | 01 |
| 05 | Violet | 290,000 | 02 |
| 06 | Red | 124,000 | 05 |

FIGURE 3

DATA PARTITIONING BY CO-LOCATING REFERENCED AND REFERENCING RECORDS

BACKGROUND OF THE INVENTION

1. Field of the Invention

This invention relates to database partitioning, and more particularly, to the partitioning of tables (also relations) in a relational database, or data objects in a distributed database.

2. Description of the Related Art

Several different schemes exist for partitioning a database table across several different systems. The schemes are chosen to enable parallel evaluation of a database query on a plurality of systems. One scheme uses a primary key to horizontally partition tuples of a table across different systems. Examples include partitioning based on a randomizing hash function of the primary key, or based on key value ranges. A database table may also be partitioned based on information not stored in a tuple (non-key-based), such as the site where the tuple was inserted, the user who inserted the tuple, or the application used to insert the tuple.

These schemes may be used for object-based databases or relational databases. The related art and present invention will be explained in terms of relational database systems. Relational database systems include objects called relations. Typically, a relation is represented (or embodied) in a table having rows and columns. The rows of a table are tuples of the represented relation; the table's columns are the relation's attributes. Relational database systems provide operations such as RESTRICT (or SELECT), JOIN, and PROJECT. Each of these operations yields a new relation. For example, RESTRICT extracts one or more tuples from a relation to yield a new relation. PROJECT extracts one or more attributes from a relation to yield a new relation. Finally, JOIN combines tuples from two relations based on one or more attributes common to both relations to yield a new relation.

The primary key of a relation is an attribute or a set of attributes, having data values unique for each tuple of the relation. As noted above, the primary key is used by schemes to partition a relation across several systems. In detail, different groups of tuples are stored on different systems, and the systems are networked together based on the primary key of the tuples. Each system has a database management system (DBMS) that handles queries for the system. Ideally, a user accessing a database on any of the systems should not be aware of the partitioning scheme employed other than by way of system performance. For example, a user may submit a query requiring access to all the tuples of a relation where the relation is partitioned across multiple systems. The DBMS of the user's system would request copies of the tuples of the relation stored on other systems. The time required to execute and complete the user's request will be a function of the capacity/usage of the other systems and the network interlinking the systems. Meanwhile, users on other systems could be making similar requests for tuples of the relation, further delaying the execution of queries.

One goal of data partitioning is to reduce the time required to process a query. If the tuples are suitably partitioned, parallel execution is possible without too much overhead. Parallel execution is impeded by queries that require access to multiple relations, such as, JOIN queries. An example of the problem of partitioning and parallel execution of database queries is presented with reference to the three tables shown in FIGS. 1, 2, and 3 and a network system shown in FIG. 4.

The tables illustrated in FIGS. 1, 2, and 3 represent CITY, EMPLOYEE and JOB relations. (These relations will now be referred to simply by their proper names). The primary keys for the relations are the city code, employee no., and job no. attributes, respectively. FIG. 4 is a simplified diagram of a networked database system 99 whose parts are joined for cooperative operation by a network 100. The system 99 includes three separate, interlinked computer sites 10, 20, and 30 located, for example, in New York, Chicago, and Los Angeles. Each computer site 10, 20, and 30 has a database management system ("DBMS") 14, 24, and 34, and online data storage 12, 22, and 32 for local database storage. If data partitioning by primary key is employed for the three relations, with equal distribution of records, CITY would be partitioned based on its primary key, the city code attribute, EMPLOYEE would be partitioned based on its primary key, the employee no. attribute, and JOB would be partitioned based on its primary key, the job no. attribute. An example of local tuple storage based on partitioning by primary key for CITY, EMPLOYEE, and JOB in the system 99 is shown in FIG. 5.

In FIG. 5, EMPLOYEE has been partitioned and locally stored in data storage 12, 22, and 32, using the employee no., with equal distribution. JOB has also been partitioned and locally stored in data storage 12, 22, and 32, using the job no., with equal distribution. It will be shown that this type of partition can cause very inefficient processing to compute JOIN. For example, users in New York, Chicago, and Los Angeles may each want to generate a new relation having all tuples for jobs being performed by employees located in their city. Execution of the sequence of steps necessary to complete the query for users in New York is presented.

First, the DBMS 14 New York generates a query sent to DBMS's 24 and 34 to evaluate each tuple of JOB that is locally stored, i.e., in data storage 22 and 32. The DBMS's 24 and 34 must send copies of those tuples of JOB where the job is being performed by an employee working in New York. In addition, the DBMS 14 must evaluate the tuples of JOB stored locally for jobs being performed by an employee working in New York. There are two tuples of JOB stored locally in data storage 12. The evaluation of the tuple for job no. 02 (job name green) is presented. JOB does not contain the city code, it only has the foreign key employee no. So, the DBMS 14 first determines that employee no. 03 is performing job no. 02 (the employee no. attribute has a value of 03). The DBMS 14 then evaluates the tuples locally stored for EMPLOYEE having the attribute employee no.=03. The tuple is not stored locally. So the DBMS 14 sends a query to the other DBMS's 24 and 34 for the tuple of EMPLOYEE for employee no. 03. The DBMS 24 will receive the request and when it has access to the tuples for employee relation stored locally, it will send a copy of the tuple for employee no. 03 over the network to the DBMS 14. The DBMS 14 will then evaluate the copy of the tuple from EMPLOYEE for employee no. 03 and determine that the city code attribute has a value of 02.

The DBMS 14 will receive the tuple for employee 03 indicating that the employee works in city code 02 (attribute city code has a value of 02). The DBMS 14 then may need to determine which city corresponds to city code 02. The tuple of CITY having the city code attribute value of 02 is also not stored locally. So the DBMS 14 may send another query request to DBMS 24 and 34 for the tuple of CITY having city code=02. The DBMS 24 will send a copy of the tuple from CITY with city code=02. Then the DBMS 14 can compare the value of the city name attribute in the CITY tuple sent from DBMS 24 to "New York" and finally determine that the tuple from JOB having the job no. attribute with a value of 02 is not being performed by an employee working in New York. This same procedure would be performed for the other tuple of JOB that is stored locally (job no.=01). At the same time, DBMS 24 and 34 perform the same procedure for each of their locally stored JOB tuples to determine if the job is performed by an employee working in New York, and send the result to DBMS 14. Finally DBMS 14 combines these results to produce an answer to the original query.

Note that the other DBMS's may not respond instantly to the queries received from DBMS 14, since they may be processing queries for local users. As can be seen, this is not an efficient use of bandwidth or resources since records are being sent between systems unnecessarily instead of being evaluated locally by each DBMS, due to the data partitioning scheme. One method to reduce such inefficiency is to co-locate the tuples of two tables that are to be JOINed by partitioning both tables on the joining attribute. For example, both the CITY and EMPLOYEE tables are partitioned on the city code attribute. In this way, a DBMS can determine locally for each local EMPLOYEE tuple the city in which the employee works. However, it then would not be possible to co-locate the JOB table with the EMPLOYEE table by partitioning them on the employee no. attribute since the EMPLOYEE table is already partitioned on the city code attribute.

Another solution proposed in the past was to add more attributes (or columns) to lower level tables (thereby flattening the database). For example, the city code attribute could be added to JOB, extending the number of attributes (or columns) of relation from four to five with information that is redundant with information in the other two relations. This technique has numerous drawbacks. First, the insertion process is made more cumbersome since a tuple from EMPLOYEE must be received to determine the city code attribute for the tuple to be inserted into JOB. Second, this flattens the database by including redundant information in a relation, which consumes storage and creates risk of inconsistent data. Third, it makes the maintenance of the relations more cumbersome since JOB needs to be updated each time the employee relation is updated, e.g., if the city code attribute is modified for a tuple in EMPLOYEE, all tuples having an employee no. attribute equal to that of the updated employee tuple would need their city attribute updated. Thus, a more suitable partitioning system or method is needed to enable parallel execution of database queries for common or logical queries based on how relations interlink.

SUMMARY OF THE INVENTION

This invention is broadly embodied in a method of partitioning a group of data records in a computer system that has more than one storage location, where at least one of the records references another record. The method includes determining in which storage location the referenced record is located. Then, the referencing record is stored at the same location as the referenced record. This partitioning scheme co-locates referenced and referencing records. The data records partitioned by this method are preferably tuples of one or more database relations.

In addition, the computer system may comprise a number of database systems, each having a separate storage area or location and database management system. In order to optimize the process of determining where a referenced record is located, an index may be maintained of the location of all referenced records. Then the index is accessed in order to determine where a particular referenced record is located. The referencing record and referenced record may be part of the same database relation or may be from different relations. This index, typically on the primary key, is normally maintained by the DBMS to facilitate tuple access and referential integrity checking. For optional processing, this index can itself by partitioned by the index key values.

The method of data partitioning can also be used when a record (or data item) is inserted into a group of records (data items) where the record references a record from the same group of records or a different group of records. In this case, the storage location of the referenced record is determined. The referencing record is then inserted into the group of records by storing the record in the same storage location as the referenced record. As before, the records may be the tuples of one or more database relation.

BRIEF DESCRIPTION OF THE DRAWINGS

FIG. 1 is a table that embodies a sample database relation entitled CITY.

FIG. 2 is a table that embodies a sample database relation entitled EMPLOYEE.

FIG. 3 is a table that embodies a sample database relation entitled JOB.

DETAILED DESCRIPTION OF THE PREFERRED EMBODIMENTS

Figure 4:
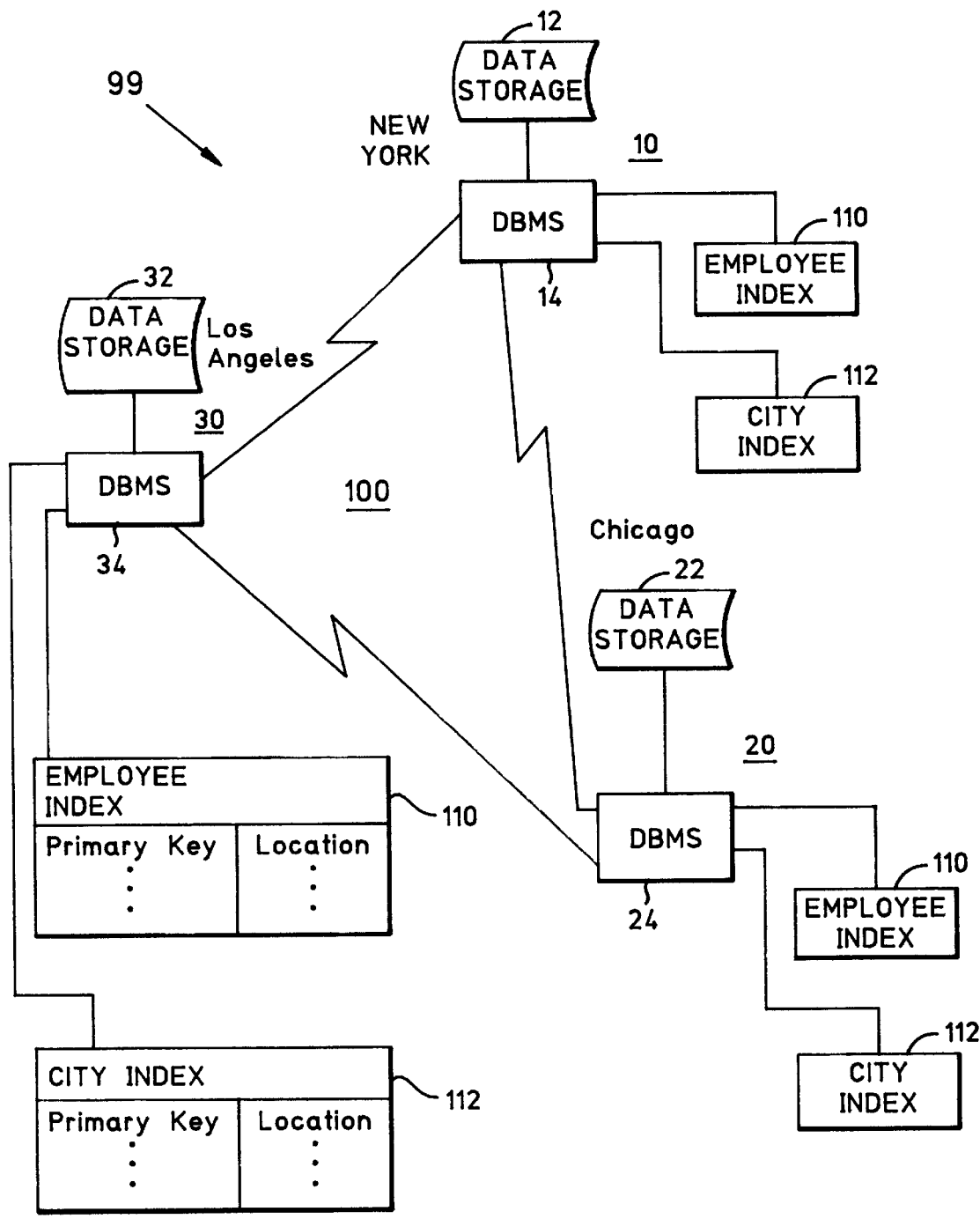
FIG. 4 is a diagram of a networked system of database systems.
Figure 5:
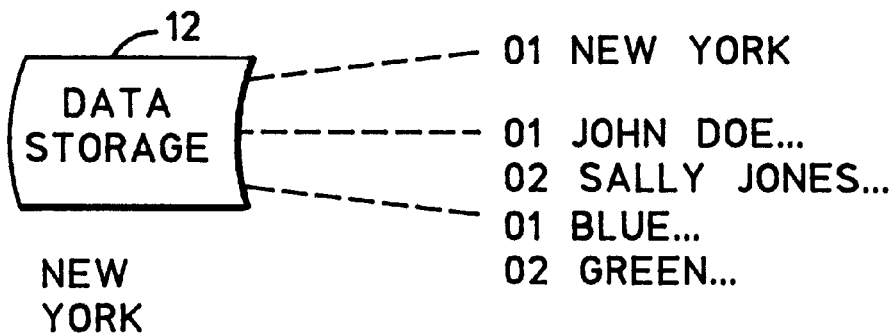
FIG. 5 is a diagram of a distribution of tuples of the relations shown in FIGS. 1, 2, and 3 into data storage areas of the database systems shown in FIG. 4 based on a prior art partitioning scheme.
Figure 5:
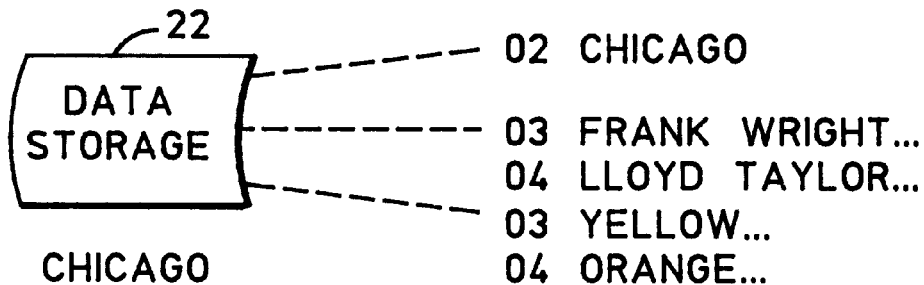
Figure 5:
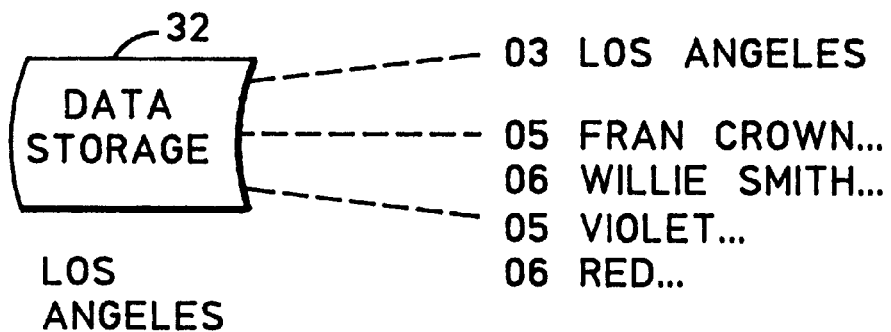

A preferred embodiment of the invention is presented with reference to FIGS. 1–4 and 6. As described above, FIG. 4 is a simplified diagram of a system 99 including a network 100 that links a plurality of computer sites 10, 20, and 30. Each computer site includes a DBMS 14, 24, or 34. Each DBMS 14, 24, and 34 is connected to a local data storage 12, 22, 32, respectively. Collectively, a DBMS and its data storage form a database system. The three computer sites 10, 20, and 30 are located in New York, Chicago, and Los Angeles. Although the present invention is described with reference to this system 99, it is applicable to any distributed system where data for relations or tables in a database system may be stored at different locations. The partitioning scheme of the present invention, partition by reference, is explained by employing the scheme to partition the CITY, EMPLOYEE, and JOB tables.

In order to partition these exemplary relations by reference, partitioning is performed in top-down order, i.e., starting with CITY, then EMPLOYEE, and finally, JOB. CITY consists of three tuples, one for each city in the system 99. This relation has no direct foreign key, i.e., an attribute which corresponds to a primary key (another attribute) of this or another relation. In this case, CITY can be partitioned using any method. Since CITY describes the cities of the system 99, it is partitioned by the city name attribute. The result of partitioning CITY is shown in FIG. 6.

EMPLOYEE has an attribute, city code, that corresponds to the primary key of CITY. The city code attribute of EMPLOYEE is thus a foreign key that references CITY. Accordingly, tuples of EMPLOYEE can then be partitioned by reference to tuples of CITY so that tuples of EMPLOYEE are co-located directly with tuples referenced in CITY. As shown in FIG. 2, the tuples of EMPLOYEE with employee no.=02, 05, and 06 reference the tuple of CITY whose city code attribute equals 01. In order to partition these tuples by reference, they are co-located in the same data storage with the tuple of CITY, as shown in FIG. 6, i.e., in data storage 12. The remaining tuples of EMPLOYEE are also partitioned by their references to tuples in CITY.

Figure 6:
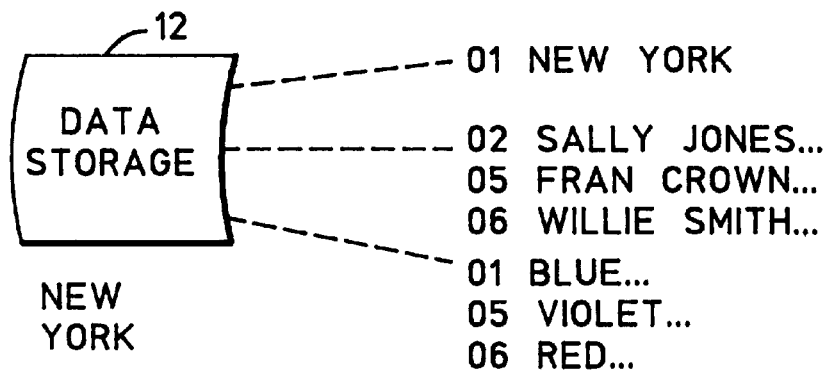
FIG. 6 is a diagram of the distribution of tuples of the relations shown in FIGS. 1, 2, and 3 into data storage areas of the database systems shown in FIG. 4 based on a partitioning scheme according to the present invention.
Figure 6:
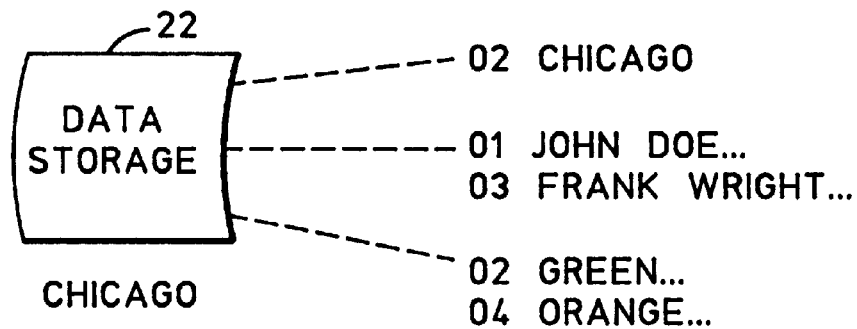
Figure 6:
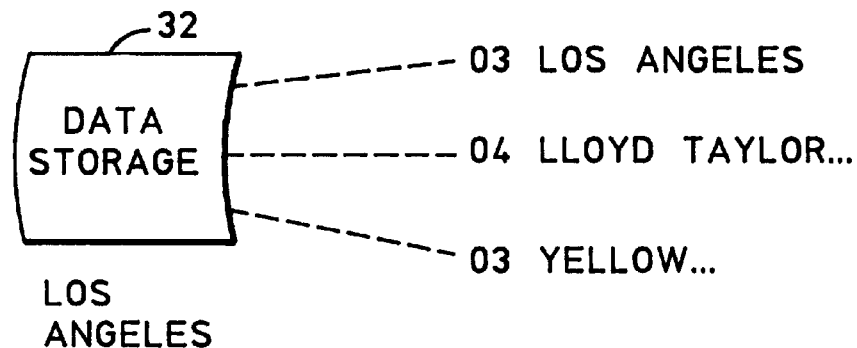

The result of this partitioning is shown in FIG. 6. For example, tuples of EMPLOYEE which reference the tuple city 02 of CITY are stored in data storage 22, i.e., employee no. 01 and 03. Likewise, the tuple of EMPLOYEE references city code 03 is stored in data storage 32, i.e., employee no. 04.

Finally, JOB shown in FIG. 3, is also partitioned by reference. JOB has an attribute, employee no. which corresponds to the primary key attribute (employee no.) of EMPLOYEE. The employee no. attribute of JOB is thus a reference to EMPLOYEE. Accordingly, tuples of JOB can then be partitioned by reference to tuples of the EMPLOYEE so that tuples of the JOB are co-located directly with EMPLOYEE tuples that they reference. Starting with the first tuple of JOB (job no. 01), this tuple references employee no. 06. Thus, this tuple will be co-located with the tuple of EMPLOYEE whose attribute employee no. is equal to 06. As noted above, this EMPLOYEE tuple is stored in data storage 12 (because it referenced the first tuple of CITY). Thus, the first tuple of JOB will be stored in data storage 12 so it is co-located directly with the EMPLOYEE tuple it references. The same procedure is followed for the remaining tuples of JOB. The results of partitioning CITY, EMPLOYEE, and JOB by reference are shown in FIG. 6.

Using the data partitioning shown in FIG. 6, a user in New York can select all employees working in New York or jobs being performed by employees in New York, without requiring the transfer of any tuples from data storage 22 or 32. Simultaneously, a user in Chicago can select all employees working in Chicago or jobs being performed by employees in Chicago and a user in Los Angeles can select all employees working in Los Angeles or jobs being performed by employees in Los Angeles. Thus, partitioning by reference enables parallel execution of database queries. Even parallel execution of JOIN queries can be performed simultaneously for JOINs involving local tuples. In order to perform the queries simultaneously, or even a single JOIN locally, the DBMS must recognize the all the tuples it needs to perform the JOIN (or SELECT, RESTRICT, or PROJECT) are present locally (in the attached data storage).

DBMS's typically include a query optimizer that receives database queries and determines optimal plans of performing the queries. For databases partitioned by reference, the query optimizer should determine whether all tuples needed to perform a database query are present locally in order to optimize the execution of the query. For queries that JOIN the foreign key of a table with the referenced primary key of another table which occur frequently, the query optimizer need only check for the presence of tuples for the referencing relation for relations partitioned by reference. Consider a JOIN of EMPLOYEE and JOB on the employee no. attribute. If the tuples of JOB involved in the join query are local, then the tuples of the EMPLOYEE will also be local by definition. Then, the query optimizer would not need to send the query to another DBMS storing tuples of EMPLOYEE and JOB, i.e., other data storage areas for partitions of these relations. As a consequence, a DBMS at one location may be able to locally perform its portion of a JOIN involving partitioned relations without accessing all the partitions of the relations.

In order to insert a tuple into a database table partitioned by reference, the location of the referenced tuple must be determined. For example, in order to store the first tuple of JOB, the DBMS must determine where the tuple in EMPLOYEE for employee no. 06 is located. Accordingly, when the first tuple of JOB is created by a user on database system 30 (Los Angeles), the storage location (database system 10 in New York) for the referenced tuple in EMPLOYEE must be determined. Then the first tuple of JOB would be sent to New York to be stored in the data storage 12 in the database system 10. This is the only look-up necessary to co-locate the JOB tuple with the referenced EMPLOYEE tuple.

A DBMS typically maintains an index on the primary key of a table, containing the storage location of the tuple corresponding to each primary key value. This index is normally used to facilitate tuple retrieval using the primary key and to enforce any referential constraint that is specified on the table. The index can be global (i.e., stored entirely at one location), or replicated, or can itself be partitioned (by index key value, for instance) and shown as EMPLOYEE INDEX 110 and CITY INDEX 112 in FIG. 4 for our example. With reference to FIGS. 1–3, EMPLOYEE INDEX 110 would indicate that tuples for employee no. 02, 05, 06 are located in data storage 12; tuples for employee no. 01 and 03 are located in data storage 22; and the tuple for employee no. 04 is located in data storage 32. Likewise, CITY INDEX 112 would indicate that city no. 01 is located in data storage 12, 02 in data storage 22, and 03 in data storage 32. Although shown as partitioned objects, the indexes 110 and 112 would be more conventionally provided in the form of a global index. Thus, with such indexes in place, in order to store a tuple into the JOB table, a DBMS uses the tuple's foreign key value (the JOB table's employee no. attribute) to look up the EMPLOYEE table primary key index 110 (indexing on the EMPLOYEE table's employee no. attribute). This immediately determines the storage location of the referenced EMPLOYEE tuple, without actually accessing the referenced EMPLOYEE tuple and without further determining the storage location of the CITY tuple referenced by the referenced EMPLOYEE tuple. This location is then used for storing the JOB tuple.

It is not contemplated that an index, global or partitioned, is necessary to support referential partitioning. Hashing, for example may be used. Indeed, the invention may utilize whatever access method is used by the DBMS to facilitate tuple retrieval and to enforce referential constraint.

Partition by reference is not limited to a relation where all the tuples reference another tuple. The technique may also be used where only some of the tuples in a relation reference another tuple. Of course, partition by reference may be used where a tuple references another tuple within the same relation. For relations where not every tuple references another tuple, a secondary partition scheme may be used. For example, if the JOB table had one or more tuples where an employee had not yet been assigned, i.e., the attribute employee no. was null, these records may be partitioned by a conventional partitioning scheme such as a key-based method. Note also, partition by reference can be used for tuples having more than one foreign key. However, only one foreign key can be used.

For example, attributes Ph.D. College, Master College, Bachelor College, and High School may be added to the EMPLOYEE table where each attribute has a code for the school attended by an employee if applicable, e.g., an employee may not have a Ph.D., Masters, Bachelors, or High School degree so these attributes may have null codes. Partition by reference may be used to co-locate tuples of the EMPLOYEE table with the tuple of a SCHOOL table representing the institution where the employee obtained his/her highest degree. In this case, the EMPLOYEE table would be partitioned by a sequence of references: (Ph.D. College, Masters College, Bachelor College, High School). Using this partition by reference scheme each tuple in the EMPLOYEE table will be co-located with the institution tuple of his/her highest degree. If the employee does not have any degrees including a high school degree (all attribute values null), the tuple can be partitioned based on the employee no. attribute.

In order to implement partition by reference, an extension to the Data Definition language ("DDL") for a relational DBMS may be made. In particular, a possible extension to SQL DDL for a relation where the partitioning foreign key is not null may be:

CREATE TABLE table_name (column_definition)
    PARTITIONED BY REFERENCE (ref_constraint_
        name)
    where the column_definition includes:
        FOREIGN KEY ref_constraint_name For relations where a partitioning foreign key may have null value, a secondary partition scheme may be employed. A possible extension to SQL DDL for such a relation may be:

CREATE TABLE table_name ( column_definition)
    PARTITIONED BY REFERENCE ( ref_constraint_
        name[, partition scheme])
where partition scheme may be any partitioning scheme supported by the DBMS such as:
    HASH ON (partition_key)
    KEYRANGE ( value, value, . . . ) ON (partition_key)
    REFERENCE (ref constraint_name . . . )

As noted above, partitioning by reference may be employed in more than relational database systems. For example, it may be employed in distributed object-oriented databases. Further, it is applicable to all data management products that support distributed databases.

A significant aspect of this invention is the fact that it imposes a partitioning scheme on only ONE table in order to achieve co-location of the tuples of TWO tables—the other table can be partitioned in any manner. As a result, multiple tables can be co-located (one by one) even if they do not all join on the same attribute, as shown by the example. Conventional, key-value-based partitioning schemes require both tables to be partitioned on the join attribute in order to achieve co-location, making it impossible to co-locate a third table if the latter has a different join attribute.

I claim:

1. In a computer system having a plurality of storage locations for storing data records, a method of partitioning a group of data records in which at least one data record includes a reference to at least one other data record which in turn includes a reference to at least a third data record stored in one of the plurality of storage locations, comprising:

identifying the at least one data record of the group of data records referencing the at least one other data record, the at least one other data record in turn referencing and being co-located with the at least a third data record;
    identifying the one of the plurality of storage locations where the at least one other data record is stored; and
    storing the at least one data record in the identified one of the plurality of storage locations.

2. The method according to claim 1, wherein the group of data records comprises tuples of a database relation.

3. The method according to claim 2, the computer system having a plurality of database systems networked together, each database system being located at a storage location and including a database management system (DBMS).

4. The method according to claim 3, wherein the group of data records comprises tuples of a first table and the at least one other data record is a tuple of a second table.

5. The method according to claim 3, wherein the group of data records comprises tuples of a first table and the at least one other data record is a tuple of the first table.

6. The method according to claim 1, wherein identifying includes:

maintaining an index of references to referenced data records, in which each reference is associated with a storage location of a referenced data record; and
    identifying the one of the plurality of storage locations where the at least one other data record referenced by the at least one data record is stored by locating the at least one other data record in the index of referenced data records.

7. The method of claim 1, wherein identifying comprises computing a function on the reference.

8. In a database system having a plurality of storage locations, a method of partitioning a relation having at least one tuple that includes a reference to at least one other tuple which in turn includes a reference to at least a third tuple stored in one of the plurality of storage locations, comprising:

identifying the at least one tuple referencing the at least one other tuple. the at least one other tuple referencing and being co-located with the at least a third tuple;
    identifying the one of the plurality of storage locations where the at least one other tuple referenced by the at least one tuple is stored; and
    storing the at least one tuple in the identified one of the plurality of storage locations.

9. The method according to claim 8, wherein the at least one other tuple is part of another relation.

10. The method according to claim 8, wherein the at least one other tuple is part of the relation.

11. The method according to claim 8, wherein identifying includes:

maintaining an index of references to referenced tuples, in which each reference is associated with a storage location of a referenced tuple; and
    identifying the one of the plurality of storage locations where the at least one other tuple referenced by the at least one tuple is stored by locating the at least one other tuple in the index of referenced tuples.

12. The method of claim 8, wherein identifying includes computing a function on the reference.

13. A method of inserting a record into a group of records in one of a plurality of storage locations where a field of the record includes a reference to a record of a first group of records and a field of the record of the first group in turn includes a reference to a record of a second group of records and where the record of the second group of records may be stored in one of the plurality of storage locations, the method comprising:

identifying the record referencing the record of a first group of records, the record of the first group of records in turn referencing and being co-located with the referenced record of the second group of records;

identifying the one of the plurality of storage locations where the record of the second group of records is stored; and inserting the record into the first group of records by storing the record in the identified one of the plurality of storage locations.

14. The method according to claim 13, wherein the first and second group of records are databases.

15. The method according to claim 13, wherein the first and second group of records are relations, the records are tuples, and the field is an attribute of the first relation.

16. The method according to claim 15, wherein the attribute of the first relation is a foreign key that references a primary key of the second relation.

17. The method according to claim 13, wherein identifying includes:

maintaining an index of references to referenced records of the second group of records, in which each reference is associated with a storage location of a referenced record; and identifying the one of the plurality of storage locations where the record of the second group of records is stored by locating the record of the second group of records in the index.

18. The method according to claim 13, wherein identifying includes computing a function on the reference.

19. A method of inserting a plurality of records into a group of records in one of a plurality of storage locations where a field of at least one of the plurality of records includes a reference to a record of a first group of records and a field of the record of the first group of records includes a reference to a record of a second group of records and where the record of the second group of records may be stored in one of the plurality of storage locations, the method comprising:

identifying the at least one of the plurality of records referencing the record of the first group of records, the record of the first group of records referencing and being co-located with the referenced record of the second group of records;

identifying the one of the plurality of storage locations where the record of the second group of records is stored; and inserting the at least one of the plurality of records into the first group of records by storing the at least one of the plurality of records in the identified one of the plurality of storage locations.

20. A method according to claim 19 further comprising inserting any of the plurality of records which do not include a field which references a record of a second group of records into the first group of records by storing into one of the plurality of storage locations as a function of an attribute of the record.

21. A method of inserting a record into a group of records in one of a plurality of storage locations where a field of the record includes a reference to a record in a first group of records and a field of the record in the first group of records in turn includes a reference to a record in a second group of records, and where the record in the second group of records may be stored in one of a plurality of storage locations, the method comprising:

identifying the record referencing the record in the first group of records, the record of the first group of records referencing and being co-located with the referenced record of the second group of records;

identifying the one of the plurality of storage locations where the record in the second group of records is stored; and inserting the record into the group of records by storing the record in the identified one of the plurality of storage locations.

22. The method according to claim 21, wherein the group of records is comprised of at least one database relation.

23. The method according to claim 22, wherein the field of the record is an attribute of at least one database relation.

24. The method according to claim 23, wherein the attribute of the at least one database relation is a foreign key that references a primary key of at least one database relation in the group of records.

25. The method according to claim 21, wherein identifying includes:

maintaining an index of referenced records in the group of records in which each reference is associated with a storage location of the referenced record; and identifying the one of the plurality of storage locations where the record in the group of records is stored by locating the record in the group of records in the index.

26. The method according to claim 21, wherein identifying includes computing a function on the reference.

* * * * *